(12) United States Patent
Utas

(10) Patent No.: US 6,647,431 B1
(45) Date of Patent: Nov. 11, 2003

(54) METHOD AND APPARATUS FOR HANDLING I/O MESSAGES

(75) Inventor: Gregory R. Utas, Irving, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/001,794

(22) Filed: Dec. 31, 1997

(51) Int. Cl.[7] .................................................. G06F 9/46
(52) U.S. Cl. ...................................................... 709/313
(58) Field of Search .............................. 709/318, 328, 709/313, 310; 710/48, 52, 40, 3; 379/156

(56) References Cited

U.S. PATENT DOCUMENTS

| | | | | |
|---|---|---|---|---|
| 4,393,470 A | * | 7/1983 | Miard ........................... | 710/15 |
| 4,980,820 A | * | 12/1990 | Youngblood ................. | 364/200 |
| 5,220,668 A | * | 6/1993 | Bullis .......................... | 709/102 |
| 5,436,966 A | * | 7/1995 | Barret et al. ........... | 379/265.03 |
| 5,761,509 A | * | 6/1998 | Danforth et al. ............. | 395/701 |
| 5,881,315 A | * | 3/1999 | Cohen ......................... | 395/872 |
| 5,926,636 A | * | 7/1999 | Lam et al. ................... | 709/313 |
| 5,951,648 A | * | 9/1999 | Kailash ....................... | 709/237 |

OTHER PUBLICATIONS

K. Maruyama, et al, "A Concurrent Object–Oriented Switching Program in Chill", IEEE, 1991, pp. 60–68.*
Custer, "Inside Windows NT," 1993, Microsoft Press, pp. 21–30 and 84–90.*
Douglas C. Schmidt and Charles D. Cranor; An Architectural Pattern for Efficient and Well–Structured Concurrent I/O; pp. 1–11.

* cited by examiner

Primary Examiner—Sue Lao
(74) Attorney, Agent, or Firm—Haynes and Boone, LLP

(57) ABSTRACT

A method for handling input/output messages for plural call processing applications which reside on a processor subsystem of a mobile switching center. An input/output message having a message transport address owned by one of the call processing applications is received at a memory subsystem thereof. The call processing application owning the received address is the application which will later handle the received message. The received address is transferred to an interrupt handler which also resides on the processor subsystem. There, a call to the call processing application which owns the address received for the incoming input/output message is issued. In response thereto, the call processing application wraps the received message with an object to be used by the received message when it is to be handled by the call processing application and stores the wrapped message at a selected location within the memory subsystem. The call processing application then schedules itself for execution.

14 Claims, 2 Drawing Sheets

METHOD AND APPARATUS FOR HANDLING I/O MESSAGES

TECHNICAL FIELD

The invention relates generally to call processing and other software applications and, more particularly, to input/output ("I/O") message handling techniques for use in call processing applications.

BACKGROUND OF THE INVENTION

Modern telecommunication switches contain vast amounts of software. Much of it is included in the switch's call processing ("CP") subsystem which provides both basic call service as well as advanced features such as call forwarding, call waiting and conference calling. As the CP subsystem of a switch must be continuously available, able to process millions of transactions per hour and maintain a software error rate of approximately 0.0001% of all calls handled thereby, configuration of the CP subsystem is oftentimes of foremost concern.

Typically, the CP subsystem includes an interrupt handler and multiple CP applications. The interrupt handler places an incoming message byte stream in a buffer owned by the I/O system. The interrupt handler then obtains a message transport address ("MTA") from the byte stream. The state of the MTA indicates which CP application is to handle the message. The CP application is then scheduled for execution. When the CP application runs, it copies the message stored in the buffer to a next data space and then formats the message to prepare it for handling. For example, many CP applications are object-oriented, i.e., include one or more objects (a discrete combination of code, i.e., a sequence of computer instructions, and data, i.e., information on which the instructions operate) for use during execution of the CP application. One example of how an object-oriented application would prepare an incoming message for handling would be to wrap the message with the code necessary to execute the data contained therein. The CP application then frees the original message.

Various shortcomings in the aforementioned technique are readily identifiable. When incoming messages are copied into the buffer owned by I/O system, they are arbitrarily assigned to locations within the buffer based upon the original size thereof. In the event that the incoming message is later formatted by the CP application, there is rarely sufficient room at the original location within the buffer to store the formatted message. For this reason, the incoming message must be copied to the next data space where there is sufficient space for both the original message and any formatting performed thereto by the CP application. Not only does this repeated copying of the message waste considerable amounts of time, but it also needlessly consumes available storage space.

SUMMARY OF THE INVENTION

The present invention is directed to a method of handling I/O messages within a processor subsystem on which one or more software applications reside. When a message to be handled is received, the software application which is to later handle the received message is identified. The identified software application pre-processes the message and then stores the pre-processed message to await handling thereby. Preferably, the received message includes an address owned by one of the software applications which reside on the processor subsystem. The address is transmitted to an interrupt handler, also residing on the processor subsystem, which uses it to identify the software application which will later handle the message. The interrupt handler will then issue a callback to the identified software application to initiate pre-processing and storage of the incoming message.

Pre-processing of the incoming message which is performed by the software application after it has been identified as the future handling application may include wrapping the message with an object to be used with the message during handling thereof. After pre-processing is complete, the software application stores the pre-processed message in a memory. In alternate aspects thereof, the memory may be a discrete memory device coupled to the software application or a designated area within a larger memory subsystem coupled to the processor subsystem. When plural software applications reside on the processor subsystem, each software application may have either a discrete memory device or a designated area within a common memory subsystem where it places pre-processed messages for later execution thereby. After placing the pre-processed messages in storage, the software application then schedules itself for execution.

By pre-processing the message using the software application which will later handle the message, performance of the I/O system may be enhanced. Specifically, by enabling the software application to format or otherwise pre-process an incoming message before it is stored to await handling thereby, the amount of time spent to copy and/or format incoming messages may be greatly reduced. Thus, when messages cross the queuing layer which separates the I/O system and the software applications, the messages may be handled immediately by the software application without any need for reformatting. Finally, as the software applications schedule themselves for execution, the present invention has advantageously decoupled the software applications from the I/O system.

While the invention is suitable for use with any memory subsystem and associated processor subsystem on which one or more software applications reside, it is contemplated that the processor subsystem may form part of a mobile switching center or other type of switch which, in turn, is part of a telecommunications network. When configured as part of a mobile switching center or other type of telecommunications switch, the software applications residing on the processor subsystem will typically be call processing applications.

DESCRIPTION OF A PREFERRED EMBODIMENT

Figure 1:
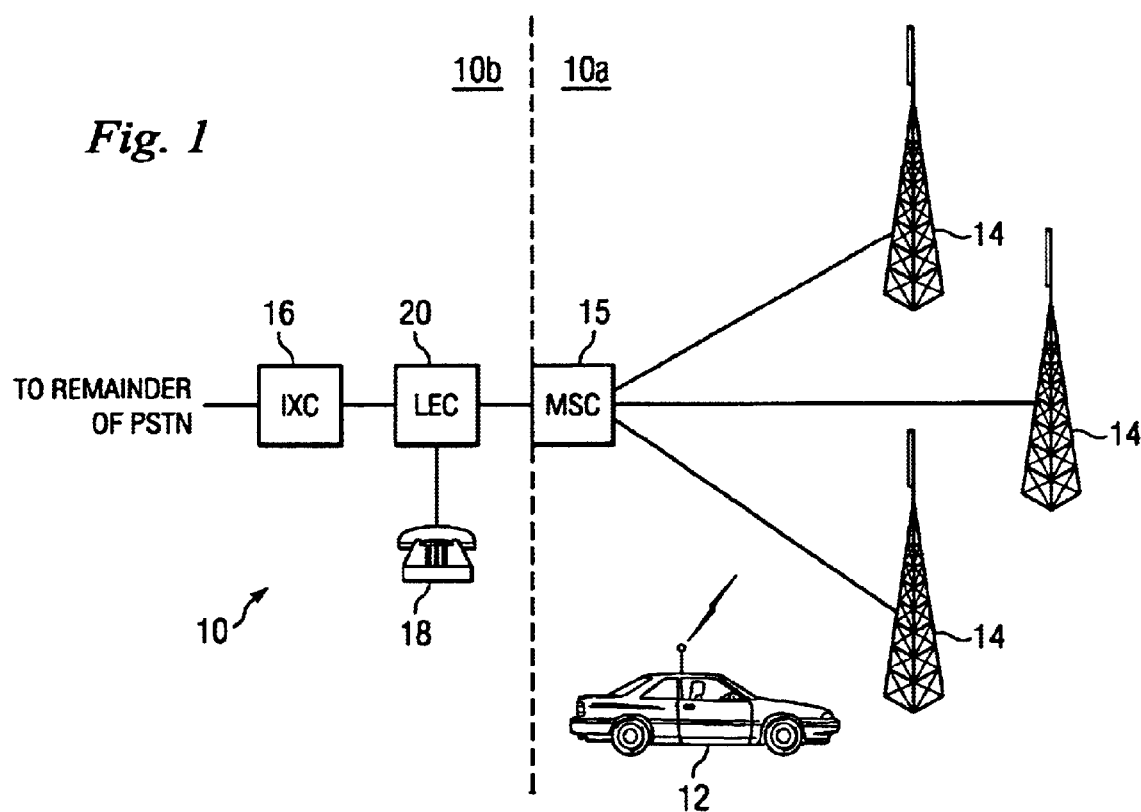
FIG. 1 is a block diagram of a telecommunications network which includes a mobile switching center constructed in accordance with the teachings of the present invention.

Turning now to the drawings, in FIG. 1, the reference numeral 10 designates a telecommunications network 10 which includes both wireless and wireline portions 10*a* and 10*b*, respectively. For example, the wireless portion 10*a* may be a cellular network while the wireline portion 10b may be a public switched telephone network ("PSTN"). The wireless portion 10a of the telecommunications network 10 include at least one mobile terminal 12 configured to transmit and receive messages to a mobile switching center ("MSC") 15 via a base station 14 within range of the mobile terminal 12 and coupled to the MSC 15. The wireline portion 10b of the telecommunications network 10 includes plural interexchange carriers (or "IXCs) 16 for establishing connections between originating and destination terminals. While the wireline portion 10b of the telecommunications network 10 would typically include plural IXCs, for ease of illustration, only one such IXC is shown in FIG. 1. Voice terminals, for example, a telephone 18, are coupled to the wireline portion 10b of the telecommunications network 10 by local exchange carriers (or "LECs") 20 which, for example, may be respective regional Bell Operating Companies (or "RBOCs"). Again, while the wireline portion 10b of the telecommunications network 10 would typically include plural voice terminals and LECs, for ease of illustration, only one such voice terminal 18 and LEC 20 are shown in FIG. 1. Finally, to couple the wireless and wireline portions 10a and 10b of the telecommunications network 10, the MSC 15 is coupled to LEC 20. Thus, a request for connection by the mobile terminal 12 may be directed by the MSC to: (1) a second mobile terminal registered with the MSC 15 and within range of one of the base stations 14; (2) a voice terminal coupled to the LEC 20 which serves the same geographical area as the MSC 15; (3) a voice or mobile terminal coupled elsewhere to the telecommunications network 10 for which the connection path would be directed from the IXC 16 to its destination elsewhere in the telecommunications network 10.

Figure 2:
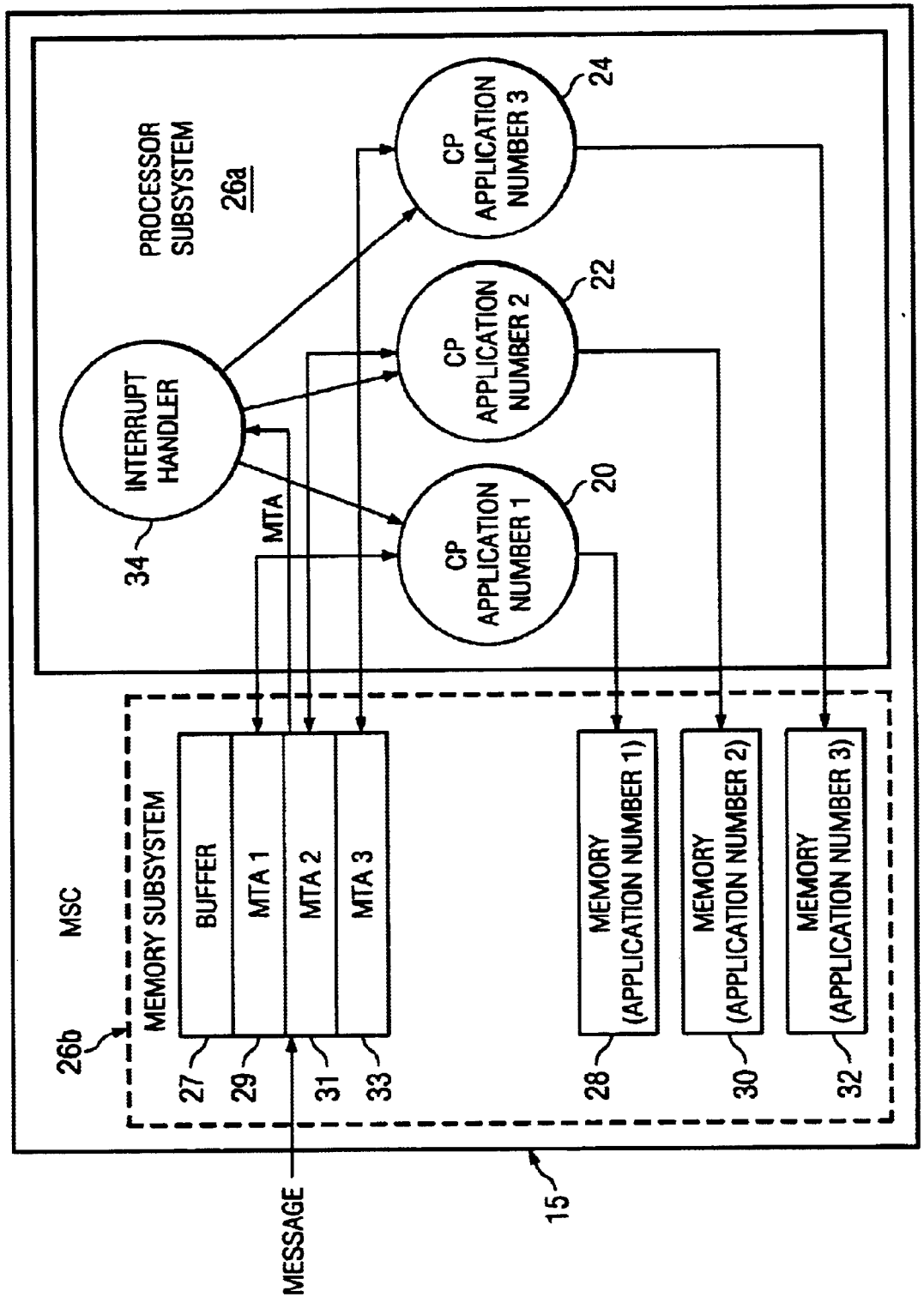
FIG. 2 is an expanded block diagram of the mobile switching center of FIG. 1.

Referring next to FIG. 2, the MSC 15 may now be seen in greater detail. Of course, it should be clearly understood that the MSC 15 has been greatly simplified and that various components thereof have been omitted for ease of illustration. The MSC 15, which, for example, may be a DMS-GSM MSC manufactured by Northern Telecom Ltd. of Montreal, Canada, performs a variety of call processing ("CP") operations such as call set-up, call forwarding and conference calling For example, in a call set-up operation, the MSC 15 would establish a connection between an originating terminal, for example, the mobile terminal 12, coupled to the MSC 15 by the base station 14, and a destination terminal, for example, the voice terminal 18 coupled to the MSC 15 by the LEC 20.

To perform these and other CP operations, the MSC 15 will typically include a processor subsystem 26a in which plural CP applications reside as software modules. For example, FIG. 2 shows first, second and third CP applications 20, 22 and 24 residing in the processor subsystem 26a of the MSC 15. Each one of the first, second and third CP applications 20, 22 and 24 are configured to perform a respective call processing task and are object-oriented programs ("OOPs") which use one or more objects during the execution thereof.

Coupled to the processor subsystem 26a and also residing within the MSC 15 are plural memories, including a buffer 27, a first memory 28, a second memory 30 and a third memory 32. In one embodiment of the invention, the buffer 27, the first memory 28, the second memory 30 and the third memory 32 may each be a discrete memory device. Alternately, the buffer 27, the first memory 28, the second memory 30 and the third memory 32 may be separate areas of a memory subsystem 26b (shown in phantom in FIG. 2) located within the MSC 15 and coupled to the processor subsystem 26a. Of course, in this embodiment, the memory subsystem 26b would most likely perform additional functions other than those specifically described herein.

As will be more fully described below, the buffer 27 receives incoming byte streams which contain I/O messages, for example, requests for connection issued by the mobile terminal 12, and is subdivided into first, second and third MTAs 29, 31 and 33 to which, depending on which of the CP applications 20, 22 and 24 is to handle the I/O message, the incoming byte stream will be addressed. Finally, also residing within the processor subsystem 26a is an interrupt handler 34 coupled to the buffer 27 to receive the MTA from an incoming byte stream and to the first, second and third CP applications 20, 22 and 24 to transmit callback instructions, to respective ones of the CP applications 20, 22 and 24, to format a message received by the buffer 27.

Figure 3:
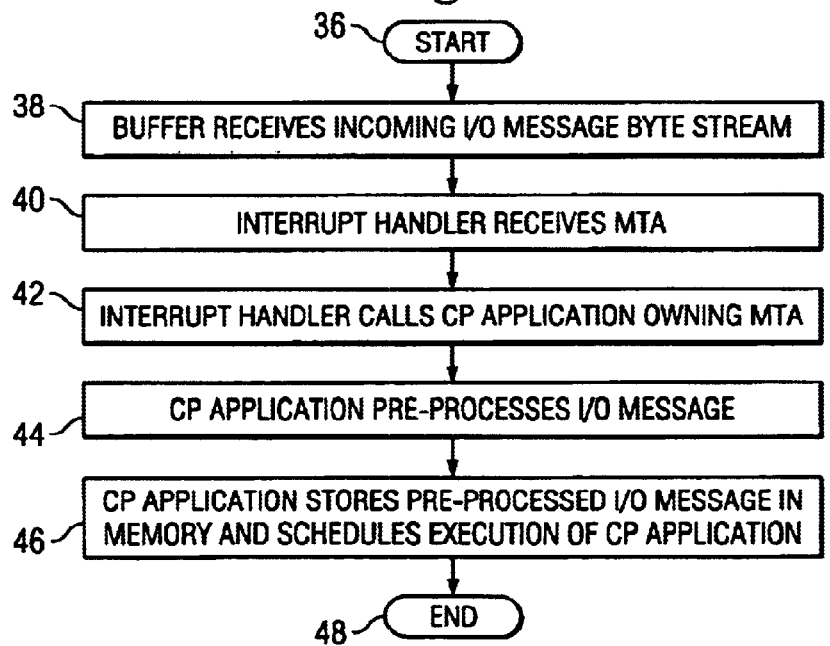
FIG. 3 is a method of handling incoming I/O messages, received by the mobile switching center of FIG. 2, in accordance with the teachings of the present invention.

Referring next to FIG. 3, a method of handling messages in accordance with the teachings of the present invention will now be described in greater detail. The method commences at step 36 and, at step 38, an incoming I/O message byte stream is received by the buffer 27. The incoming byte stream is directed to an MTA 29, 31 or 33 owned by one of the CP applications 20, 22 and 24 residing in the processor subsystem 26a. Proceeding to step 40, the MTA 29, 31 or 33 to which the incoming I/O message byte stream was directed is transferred to the interrupt handler 34. The interrupt handler 34 associates the received MTA with one of the CP applications 20, 22 and 24 and, continuing on to step 42, invokes the CP application 20, 22 or 24 associated with the received MTA to format and store the message received by the buffer 27 and schedule itself for execution.

As used herein, formatting of an I/O message performed by the CP application 20, 22 or 24 which owns the received MTA at step 44 refers to pre-processing of the I/O message that will enable the CP application 20, 22 or 24 to more quickly handle the message when it executes itself. While it is contemplated that various types of pre-processing of the message may be performed by the CP application 20, 22 or 24, one example of suitable pre-processing which may be performed thereby would be to wrap the I/O message with an object which will be used to process the data contained in the I/O message when the CP application 20, 22 or 24 later handles the message.

For example, a message may be a request, by the mobile terminal 12 for connection with a voice terminal 18, and data to be used in processing the request, here, identifying information for the mobile terminal 12 making the request and the telephone number of the destination terminal 18. For the appropriate application, here, the first CP application 20, to handle the request for connection, certain tasks must be performed thereby. For example, the first CP application 20 may need to authenticate the mobile terminal 12 issuing the request for connection. The first CP application 20 may then wrap the authentication process around the message containing the identifying information to be authenticated. Thus, when the first CP application 20 later handles the message, stored together in the I/O message queue 26b will be both the data to be authenticated and the code used to authenticate the data.

Continuing on to step 46, upon completing pre-processing of the I/O message, for example, by wrapping the I/O message with the object to be used to process the I/O message, the CP application 20, 22 or 24 stores the pre-processed message at a selected location within the corresponding memory 28, 30 or 32. The CP application 20, 22 or 24 then arranges for handling of the message by scheduling itself for execution. The method then ends at step 48.

Although illustrative embodiments of the invention have been shown and described, other modifications, changes, and substitutions are intended in the foregoing disclosure. For example, while three CP applications 20, 22 and 24 are disclosed as residing in the processor subsystem 26a, it is specifically contemplated that any number and/or type of CP applications may reside therein. Furthermore, while the invention is disclosed as residing in an MSC of a cellular telecommunications network, it is equally suitable for use in IXCs, LECs and other telecommunication devices. Finally, while the invention disclosed herein performs certain handling operations for plural call processor applications executed within an MSC of a cellular telecommunications network, the invention is equally suitable for use within a wide variety of computer systems in which messages are handled by software applications residing therein. Accordingly, it is appropriate that the appended claims be construed broadly and in a manner consistent with the scope of the invention.

What is claimed is:

1. For a processor subsystem on which one or more software applications reside, a method of managing a memory of said processor system for handling messages for said one or more software applications, comprising the steps of:

associating each software application with a corresponding one of a plurality of software memory sections;

receiving a message by said processor system to be handled by one of said one or more software applications, said received message needing to be pre-processed into a pre-processed message and stored in one of a plurality of message memory sections, wherein each software application is associated with a corresponding one of the plurality of message memory sections;

selecting a first one of the software memory sections for storage of the received message, said selection based on the received message;

selecting the software application associated with the selected memory section to handle said received message;

pre-processing said received message with the selected software application and storing said pre-processed message to the message memory section associated with the selected software application for further processing of said pre-processed message, and processing the pre-processed message with the selected software application;

wherein said software memory section and said message memory section do not overlap on each other, and wherein the above steps eliminate a need of temporarily pre-processing and storing said pre-processed message in a shared memory of said processor system.

2. The method of claim 1 wherein the step of pre-processing said received message further comprises the step of wrapping said received message with an object to be used with said message.

3. The method of claim 1, wherein:

said step of receiving a message to be handled further comprises the step of receiving a message having an address owned by one of said one or more software applications.

4. The method of claim 1 and further comprising the step of:

said selected software application scheduling itself for execution to handle said pre-processed message.

5. For a telecommunication system having a processor subsystem on which plural software applications reside and a memory subsystem, a method of managing said memory subsystem for handling input/output ("I/O") messages for said plural software applications, comprising the steps of:

associating each software application with a software buffer memory section and a message buffer memory section in said memory subsystem;

receiving, at said memory subsystem, a received I/O message to be handled by one of said plural software applications, said received I/O message needed to be pre-processed and stored in said memory subsystem;

identifying a first software application to handle said received I/O message based on information present in the received message;

storing said received I/O message in the software buffer memory section associated with said first software application;

pre-processing said received I/O message with said first software application and storing said pre-processed I/O message at the message buffer memory section associated with said first software application of said memory subsystem, and processing said pre-processed message using said first software application;

wherein said software buffer memory section and said message buffer memory section do not overlap on each other; and wherein the above steps eliminate a need of temporarily pre-processing and storing said pre-processed message in a shared buffer memory of said memory subsystem.

6. The method of claim 5 wherein the received I/O message includes an address owned by one of said plural software applications.

7. The method of claim 6 wherein an interrupt handler resides on said processor subsystem and wherein the step of identifying a first one of said software applications to handle said received I/O message further comprises the steps of:

transferring said address to said interrupt handler;

said interrupt handler identifying which one of said plural software applications owns said address and issuing a call, to said identified one of said plural software applications, to initiate said pre-processing and storing steps.

8. The method of claim 7 wherein the step of pre-processing said received I/O message further comprises the step of wrapping said received I/O message with an object to be used with said received I/O message.

9. The method of claim 8 wherein said telecommunication system is a switch in a telecommunications network and wherein each one of said plural software applications is a respective call processing application.

10. The method of claim 9 wherein said switch is a mobile switching center of a cellular telecommunications network.

11. The method of claim 5 and further comprising the step of:

said first software application scheduling itself for execution to process said pre-processed I/O message.

12. A switch for a telecommunications network, comprising:

a processor subsystem;

one or more call processor applications residing on said processor subsystem;

a memory subsystem, coupled to said processor subsystem, for receiving input/output ("I/O") messages for later handling by said one or more call processor applications, each of said one or more applications assigned with a memory section; and means for selecting one of said one or more call processor applications to pre-process one of said received I/O messages such that one of said received I/O messages is pre-processed into a preprocessed message, means for storing said pre-processed message in the memory section assigned to said selected application upon receiving one of said received I/O messages, and means for retrieving said pre-processed message from said memory section for processing by said selected application that performed the pre-processing;

wherein the respective memory sections do not overlap on each other; and wherein the above steps eliminate a need of temporarily pre-processing and storing said pre-processed message in a shared memory space of said memory subsystem.

13. A switch according to claim 12 further comprising:

a handler residing on said processor subsystem, said handler coupled to said memory subsystem, and said one or more call processor applications, said handler receiving, from said memory subsystem, for each I/O message received thereby, an address owned by said selected call processing application and issuing, to said call processing application which owns said address, a call to initiate said pre-processing and storing steps.

14. A switch according to claim 13 wherein said switch is a mobile switching center.

* * * * *